US011951501B2

(12) United States Patent
Lin et al.

(10) Patent No.: US 11,951,501 B2
(45) Date of Patent: Apr. 9, 2024

(54) SWING STRUCTURE AND CORRESPONDING WATER OUTLET DEVICE

(71) Applicant: JOMOO KITCHEN & BATH CO., LTD., Fujian (CN)

(72) Inventors: Xiaofa Lin, Fujian (CN); Xiaoshan Lin, Fujian (CN); Shaochun Liu, Fujian (CN); Rong Chen, Fujian (CN)

(73) Assignee: JOMOO KITCHEN & BATH CO., LTD., Fujian (CN)

( * ) Notice: Subject to any disclaimer, the term of this patent is extended or adjusted under 35 U.S.C. 154(b) by 128 days.

(21) Appl. No.: 17/403,887

(22) Filed: Aug. 17, 2021

(65) Prior Publication Data

US 2022/0314246 A1 Oct. 6, 2022

(30) Foreign Application Priority Data

Mar. 31, 2021 (CN) ........................ 202110351468.5
Mar. 31, 2021 (CN) ........................ 202120658901.5

(51) Int. Cl.
*B05B 3/04* (2006.01)

(52) U.S. Cl.
CPC .................................... *B05B 3/04* (2013.01)

(58) Field of Classification Search
CPC .......... B05B 3/02; B05B 3/04; B05B 3/0409; B05B 3/0418; B05B 3/0422; B05B 3/0427; B05B 3/0431; B05B 3/0436; B05B 3/044; B05B 3/0459; B05B 3/14; B05B 3/16
See application file for complete search history.

(56) References Cited

U.S. PATENT DOCUMENTS 4,073,438 A * 2/1978 Meyer .................. B05B 3/0463 239/227
5,988,529 A * 11/1999 Suhring .................... B60S 1/52 239/589.1
8,444,065 B2 * 5/2013 Aihara ................. B05B 3/0422 239/227

* cited by examiner

*Primary Examiner* — Darren W Gorman
(74) *Attorney, Agent, or Firm* — JCIPRNET

(57) ABSTRACT

The present disclosure discloses a swing structure and a corresponding water outlet device. A water passing chamber in a body of the swing structure is equipped with a swing member, and an upper end of the swing member is provided with a recess facing a water inlet hole of the water passing chamber. The water flow impacts the recess to drive the swing member to swing to one side randomly. After a lower end of the swing member is out of range of a water outlet hole of the water passing chamber, the upper and lower ends of the swing member are adjacent to or abut against a wall of the water passing chamber, so that the swing member can swing back and forth.

12 Claims, 18 Drawing Sheets

SWING STRUCTURE AND CORRESPONDING WATER OUTLET DEVICE

CROSS-REFERENCE TO RELATED APPLICATION

This application claims the priority benefit of China application serial no. 202110351468.5, filed on Mar. 31, 2021, and China application serial no. 202120658901.5 filed on Mar. 31, 2021. The entirety of each of the above-mentioned patent applications is hereby incorporated by reference herein and made a part of this specification.

BACKGROUND

Field of the Disclosure

The disclosure relates to the technical field of water outlet devices, in particular to a swing structure and a corresponding water outlet device.

Description of Related Art

Some of the existing water outlet devices serve a water outlet function to form a swinging water splash. The realization of this water outlet function generally requires a swing structure to be installed inside the water outlet device. This swing structure then drives the water outlet member to swing relative to the body of the water outlet device, so that the water splash has a swinging effect. Generally speaking, most of the current swing structures adopt an impeller as the main driving component. After the water hits the impeller, the impeller will be driven to rotate. Then the impeller can cooperate with multiple sets of gears to make the final water outlet member swing back and forth within a certain angle range. Due to the high rotation speed of the impeller, multiple sets of gears are needed to maintain the swing frequency of the water splash within an appropriate range. Therefore, such structure is more complicated as a whole, the reliability is low, and the manufacturing cost is also high.

SUMMARY OF THE DISCLOSURE

The following is a summary of the subject matter described in detail in this disclosure. The summary is not intended to limit the scope of the claims.

The embodiments of the disclosure provide a swing structure and a corresponding water outlet device. The swing structure is swingably equipped with a swing member in a body having a water passing chamber. Two side walls of the swing member perpendicular to a swing axis are in clearance fit with the corresponding two chamber walls of the water passing chamber. An upper side and a lower side of the swing member are respectively provided with a first end portion and a second end portion. The first end portion is provided with a recess with an opening facing the water inlet hole of the water passing chamber. After the swing member is impacted by water flow and the second end portion is out of range of a water inlet hole of the water passing chamber, the first end portion and the second end portion of the swing member are adjacent to or abut against the chamber wall of the water passing chamber.

BRIEF DESCRIPTION OF THE DRAWINGS

In order to explain the technical solutions of the embodiments of the present disclosure more clearly, the following briefly describes the drawings used in the description of the embodiments. Obviously, the drawings in the following description are some embodiments of the present disclosure. For those of ordinary skill in the art, other drawings can be obtained based on these drawings without making inventive effort.

DESCRIPTION OF EMBODIMENTS

The technical solutions in the embodiments will be clearly and thoroughly described below with reference to the accompanying drawings.

First Embodiment

Figure 1:
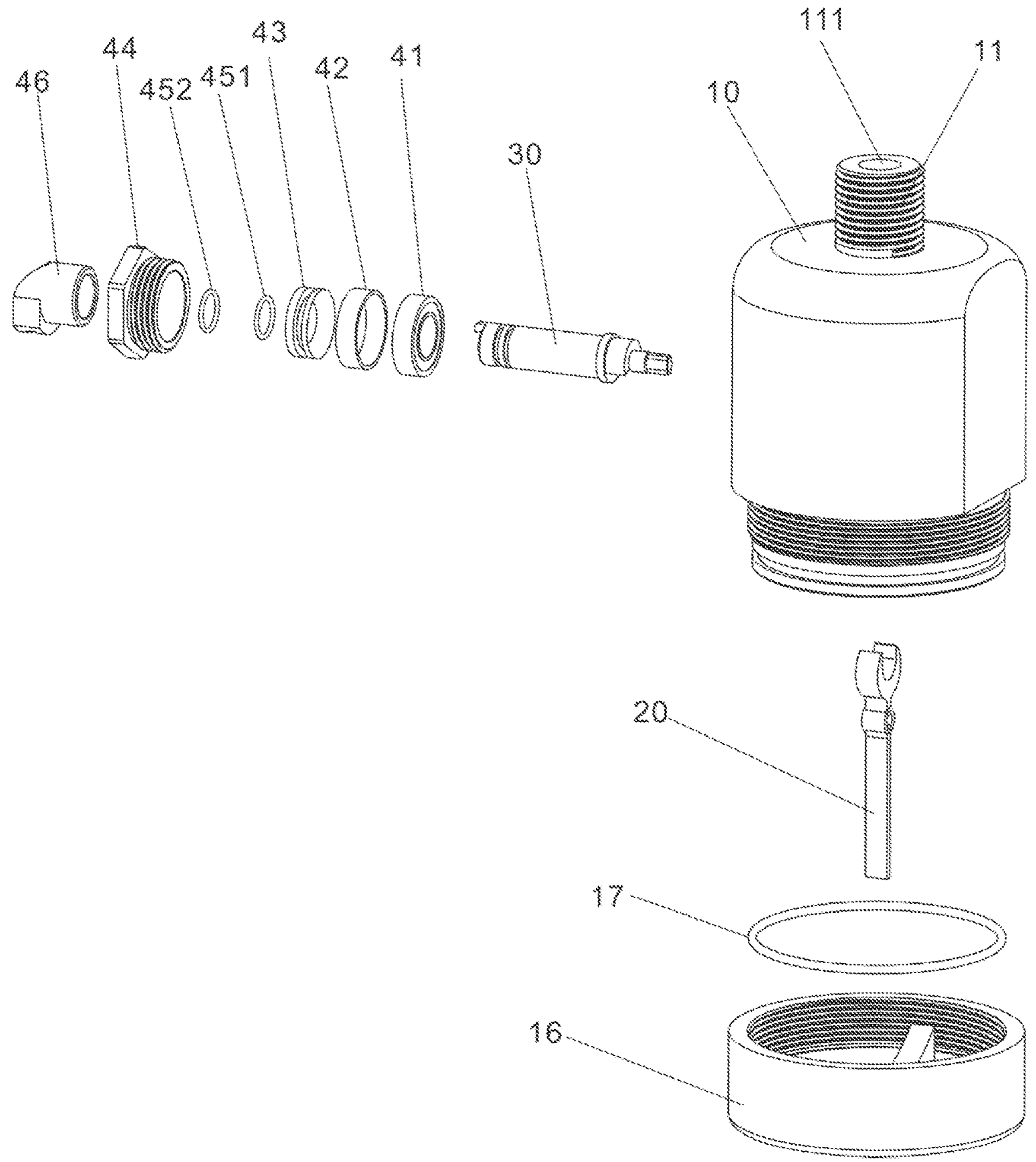
FIG. 1 is an exploded view of a first embodiment of a water outlet device provided by the present disclosure.

Referring to FIG. 1, FIG. 1 shows an exploded view of a water outlet device provided by the first embodiment of the present disclosure. The water outlet device mainly includes a body, a first sealing ring 17, a swing member 20 and a water outlet assembly. The body and the swing member 20 cooperatively form a swing structure of the present disclosure.

The body includes a first base 10 and a second base 16.

Figure 2:
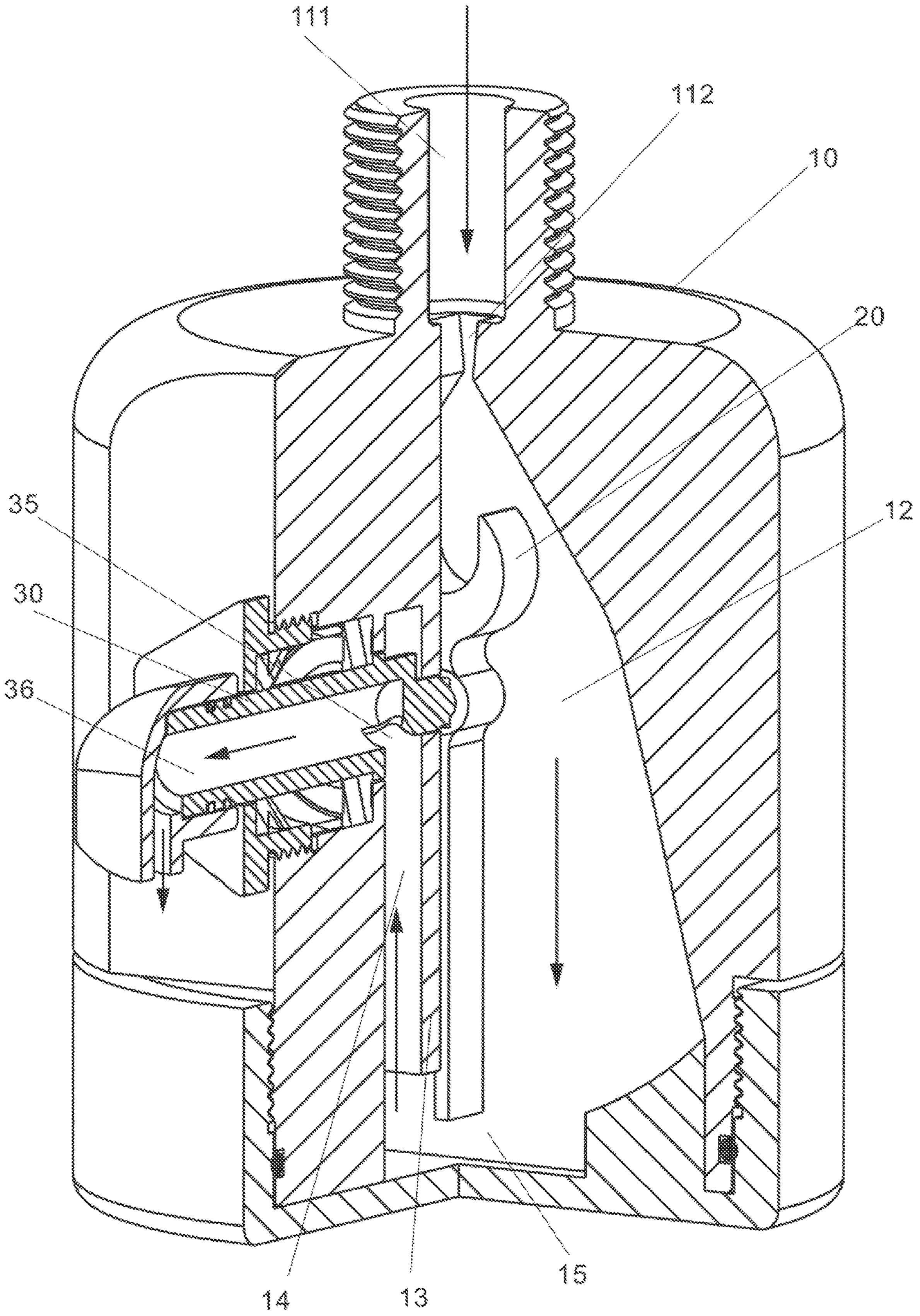
FIG. 2 is a perspective cross-sectional view of the water outlet device in FIG. 1 after being assembled.
Figure 3:
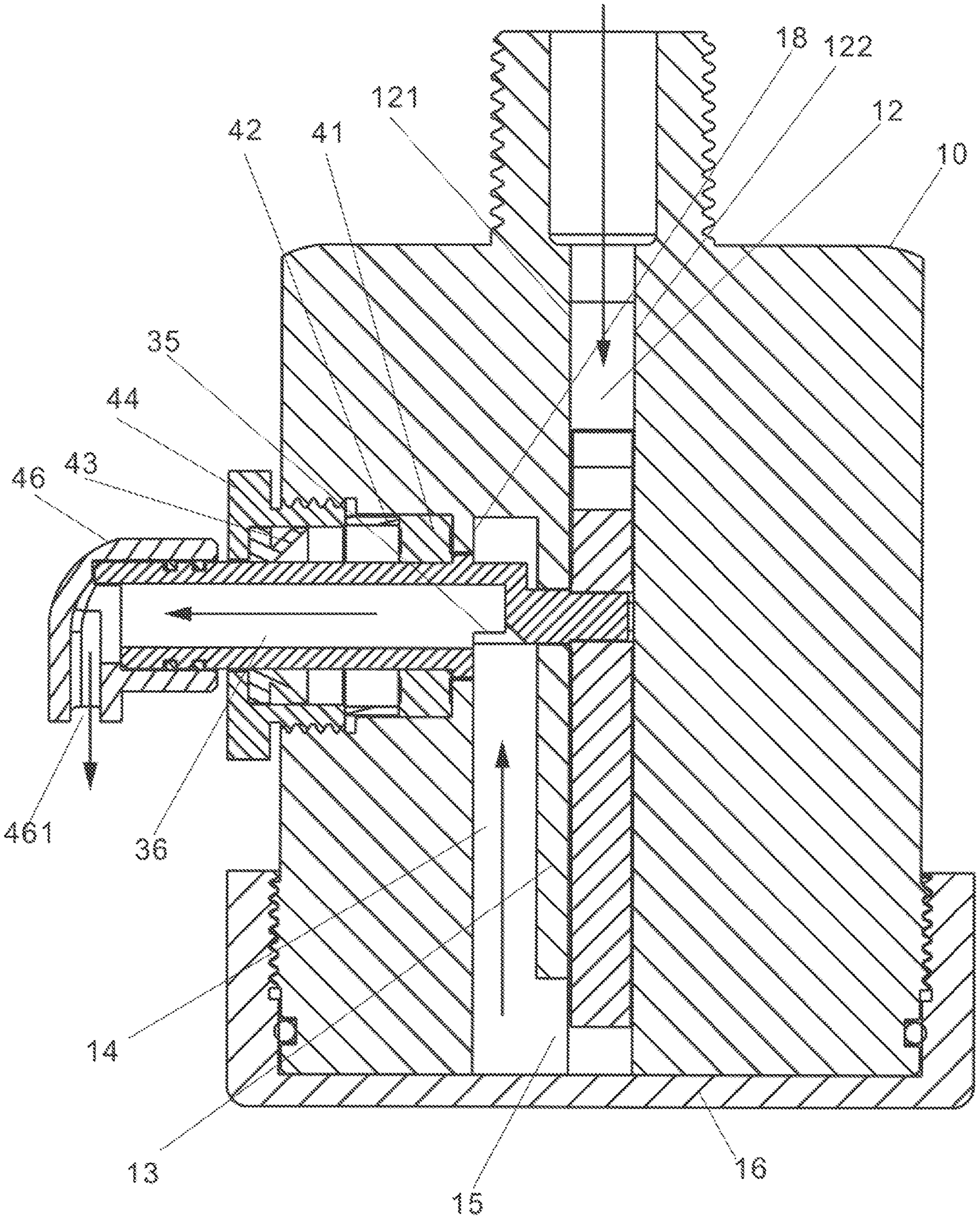
FIG. 3 is a plan sectional view of the water outlet device in FIG. 1 after being assembled.

Referring to FIG. 2 and FIG. 3, the first base 10 is a cylindrical member with a through structure that penetrates its upper and lower ends along its axial direction. Taking the view of FIG. 3 as an example, the cross section of the through structure is rectangular in a lateral direction perpendicular to the axial direction of the first base 10. The upper end and the lower end of the through structure are provided with openings to form a chamber with openings. The opening at the upper end of the through structure forms a water inlet hole 112, and the wall of the water inlet hole 112 gradually shrinks from top to bottom, so that the flow rate of the water jetted from the water inlet hole 112 can be increased. An opening is also formed at the lower end of the through structure, and the size of the opening is relatively large. A water inlet connector 11 is provided on an upper end surface of the first base 10. A thread is provided on an outer wall surface of the water inlet connector 11, and the water inlet connector 11 can be connected to an external water inlet pipe through the thread. A water inlet channel 111 is provided inside the water inlet connector 11. A lower end of the water inlet channel 111 communicates with the water inlet hole 112, and is configured to introduce water into the water inlet hole 112. A thread is provided on an outer wall at a lower side of the first base 10, and this thread is configured for screw connection with the second base 16. A sealing ring groove is also provided at a lower side of the thread that provided on the lower side of the first base 10, and the sealing ring groove is configured for mounting the first sealing ring 17, so as to form a seal between the first base 10 and the second base 16 to avoid water leakage.

A water baffle 13 is provided inside the first base 10. Referring to FIG. 3, the above-mentioned chamber is formed on a right side of the water baffle 13, and another chamber is formed on a left side of the water baffle 13. A bottom end of the water baffle 13 is higher than a lower end surface of the first base 10. Such configuration allows the two chambers to communicate through the space below the water baffle 13. In addition, the water baffle 13 is also provided with an insertion hole that penetrates the two chambers.

The first base 10 is also provided with a mounting hole for mounting the water outlet assembly. An opening of the mounting hole is arranged on a sidewall of the first base 10, and an inner wall of the mounting hole near the opening is provided with internal threads. The inner wall of the mounting hole close to the chamber on the left of the water baffle 13 is provided with a barrier wall 18 extending toward the axis of the mounting hole.

Please refer to FIG. 1, FIG. 2 and FIG. 3 for the structure of the second base 16. The shape of the second base 16 corresponds to the shape of the threaded area at the lower side of the first base 10. The inner wall of the second base 16 is provided with internal threads that are adapted to the first base 10, so that the second base 16 can be fixed on the first base 10 through the threads. In the meantime, there are two symmetrical protruding structures protruding toward the first base 10 on the inner side of the second base 16. These two protruding structures can be inserted from the opening below the first base 10 into the internal chamber of the first base 10 after the second base 16 and the first base 10 are fixed, and form the water passing chamber 12 in cooperation with the first base 10, and form the water outlet hole 15 at the bottom portion of the water passing chamber 12. Meanwhile, the second base 16 seals the opening below the first base 10, such that the water passing chamber 12 and the water passing channel 14 are respectively formed on both sides of the water baffle 13. The water passing chamber 12 and the water passing channel 14 communicate with each other through the water outlet hole 15 at the bottom portion.

Figure 6:
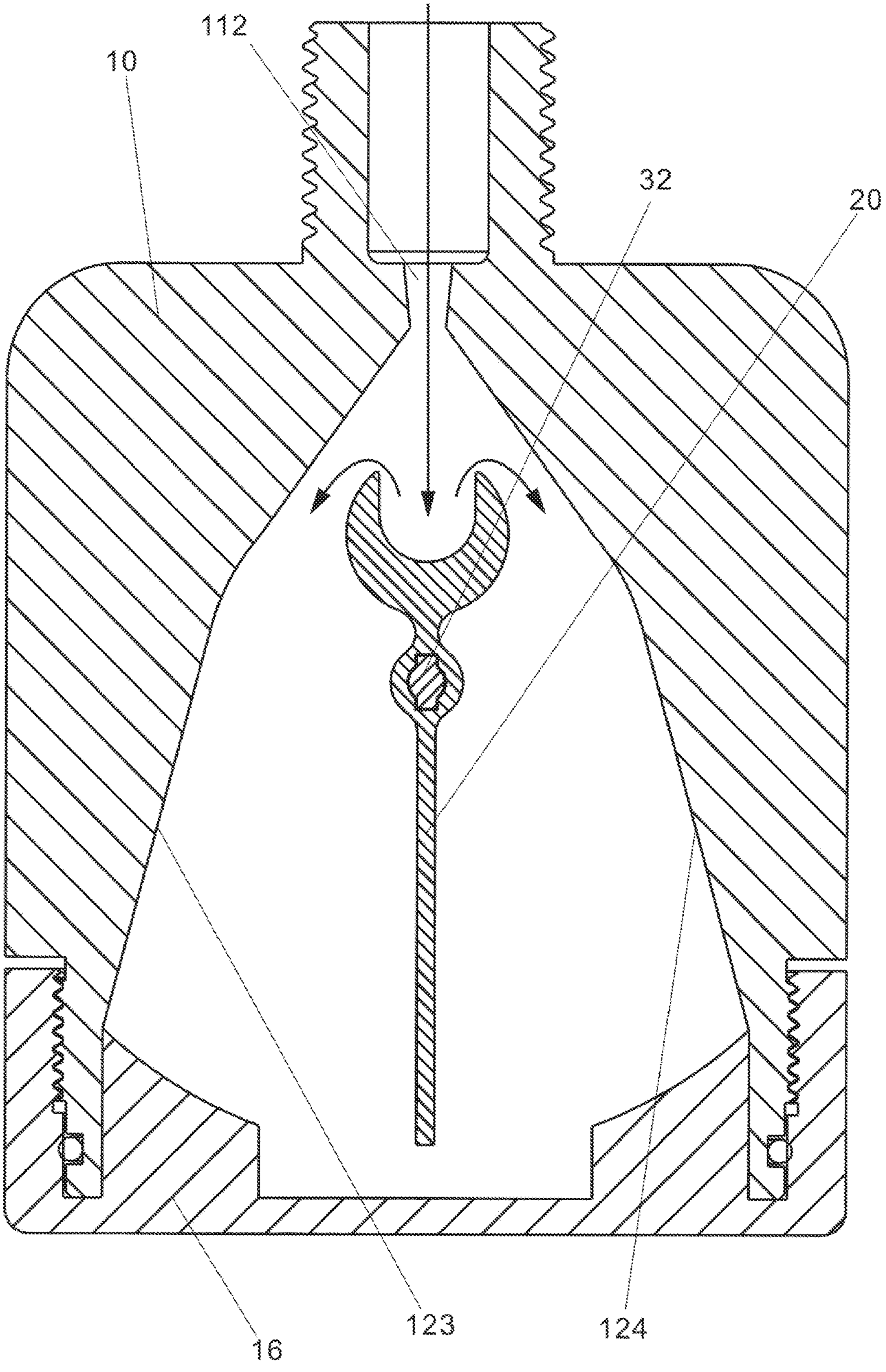
FIG. 6 is a schematic view illustrating that the swing member of the water outlet device in FIG. 1 is in an initial position.

Furthermore, the water passing chamber 12 can be regarded as composed of four chamber walls. Referring to FIG. 3 and FIG. 6, in FIG. 3, the two sidewalls on the left and right sides of the water passing chamber 12 are a first chamber wall 121 and a second chamber wall 122, respectively. The wall surfaces of the first chamber wall 121 and the second chamber wall 122 are parallel to each other, and the distance between the first chamber wall 121 and the second chamber wall 122 is relatively close. In FIG. 6, the two sidewalls on the left and right sides of the water passing chamber 12 are a third chamber wall 123 and a fourth chamber wall 124, respectively. The third chamber wall 123 and the fourth chamber wall 124 are both cooperatively formed by the first base 10 and the second base 16, and the shapes of the two are symmetrical in the section shown in FIG. 6. The third chamber wall 123 and the fourth chamber wall 124 are far away from each other at the position close to the opening of the water inlet hole 112 in the water passing chamber 12. When the third chamber wall 123 and the fourth chamber wall 124 extend to the lower part of the body, the chamber walls of the third chamber wall 123 and the fourth chamber wall 12 which are formed by the protruding structure on the second base 16 and close to the opening of the water outlet hole 15 in the water passing chamber 12 are close to each other.

The swing member 20 is mounted in the water passing chamber 12 and is connected to the body in a swinging manner around the swing axis. Referring to FIG. 3, a width of the swing member 20 in the view shown in FIG. 3 is substantially equal to the distance between the first chamber wall 121 and the second chamber wall 122. Such configuration makes the two sidewalls of the swing member 20 perpendicular to the swing axis of the swing member 20 be in clearance fit with the first chamber wall 121 and the second chamber wall 122 of the water passing chamber 12 respectively and correspondingly. As such, it is difficult for water to flow through the clearance, and the swing action of the swing member 20 in the water passing chamber 12 is not interfered. The above design of splitting the body can facilitate the installation of the swing member 20. The swing member 20 can be mounted on the first base 10 or the second base 16 through a structure such as a shaft. In this embodiment, the swing member 20 is mounted on the first base 10.

Figure 4:
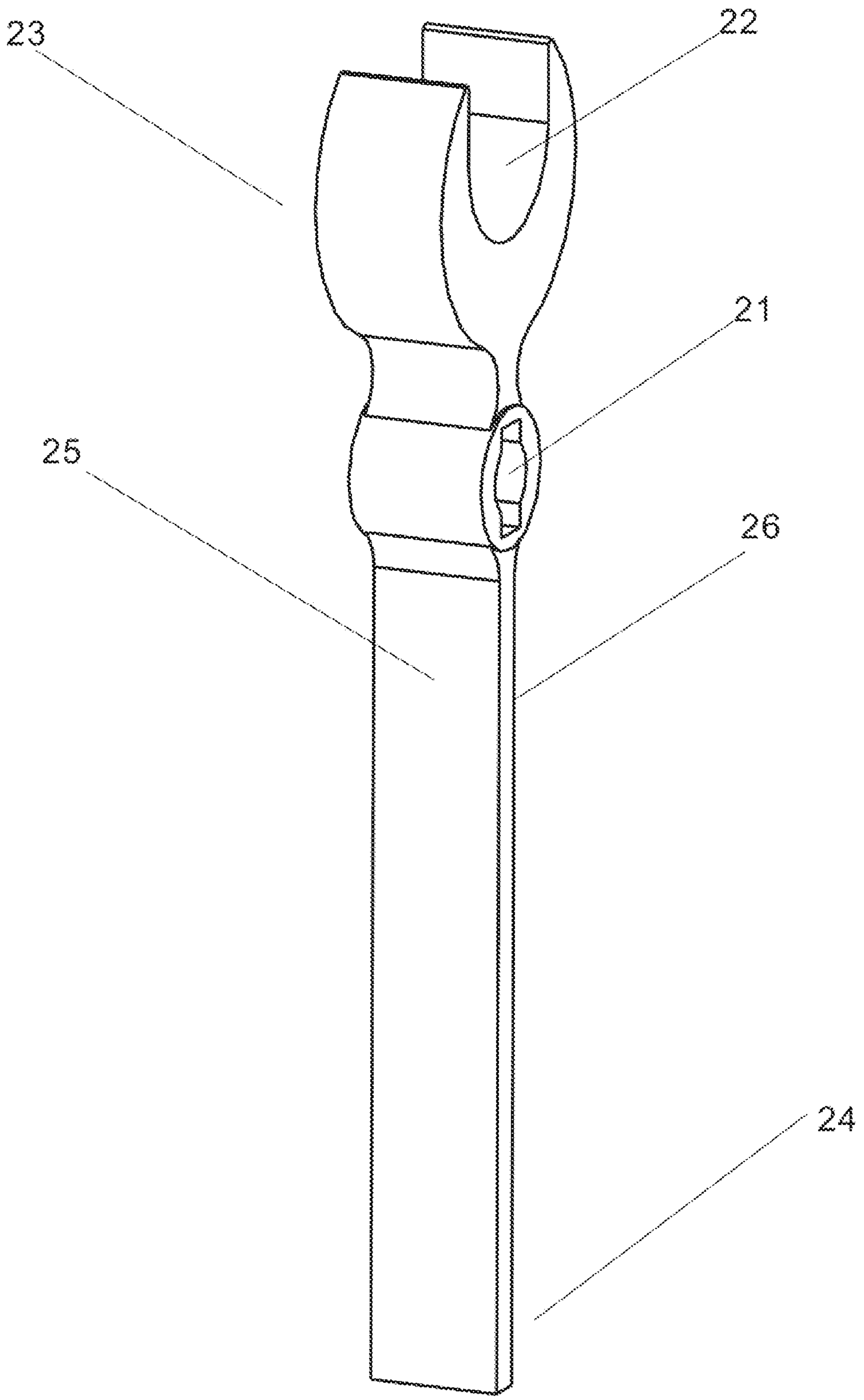
FIG. 4 is a schematic view of a swing member in FIG. 1.

Referring to FIG. 4, the swing member 20 can be regarded as a lever member, which has two ends. Taking the view of FIG. 6 as an example, the upper and lower sides of the swing member 20 respectively form a first end portion 23 and a second end portion 24, both of which can be regarded as the area where the swing member 20 receives force concentratively. There is a bore 21 provided between the first end portion 23 and the second end portion 24, and the bore 21 is relatively closer to the first end portion 23, which makes the length of the swing member 20 on both sides of the bore 21 unequal. The swing axis of the swing member 20 and the axis of the bore 21 are on the same straight line. A recess 22 is provided at the position where the first end portion 23 of the swing member 20 is located. An opening of the recess 22 is oriented upward, and the recess 22 is a through groove whose two ends are not closed. In addition, two sidewalls parallel to the swing axis of the swing member 20 are formed on the outside of the swing member 20, namely the first sidewall 25 and the second sidewall 26. These two sidewalls are the force-receiving surfaces of the swing member 20 in the water passing chamber 12 for receiving water flow.

In addition, the third chamber wall 123 and the fourth chamber wall 124 of the water passing chamber 12 are far away from each other at the position where the water inlet hole 112 is located, and the third chamber wall 123 and the fourth chamber wall 124 of the water passing chamber 12 are close to each other at the position where the water outlet hole 15 is located, forming an inclined wall structure that can make the first end portion 23 and the second end portion 24 of the swing member 20 to be adjacent to or abut against the third chamber wall 123 and the fourth chamber wall 124 after swinging to the right position, and when the swing member 20 is at or near an initial position, it can be ensured that there is enough water flow that flows from the water inlet hole 112 to the water outlet hole 15.

The water outlet assemblies include the water outlet member, the bearing 41, the retaining ring 42, the V-shaped sealing ring 43, the nut 44, the second sealing ring 451, and the third sealing ring 452.

The water outlet member includes a water outlet member body 30 and a water outlet connector 46.

Figure 5:
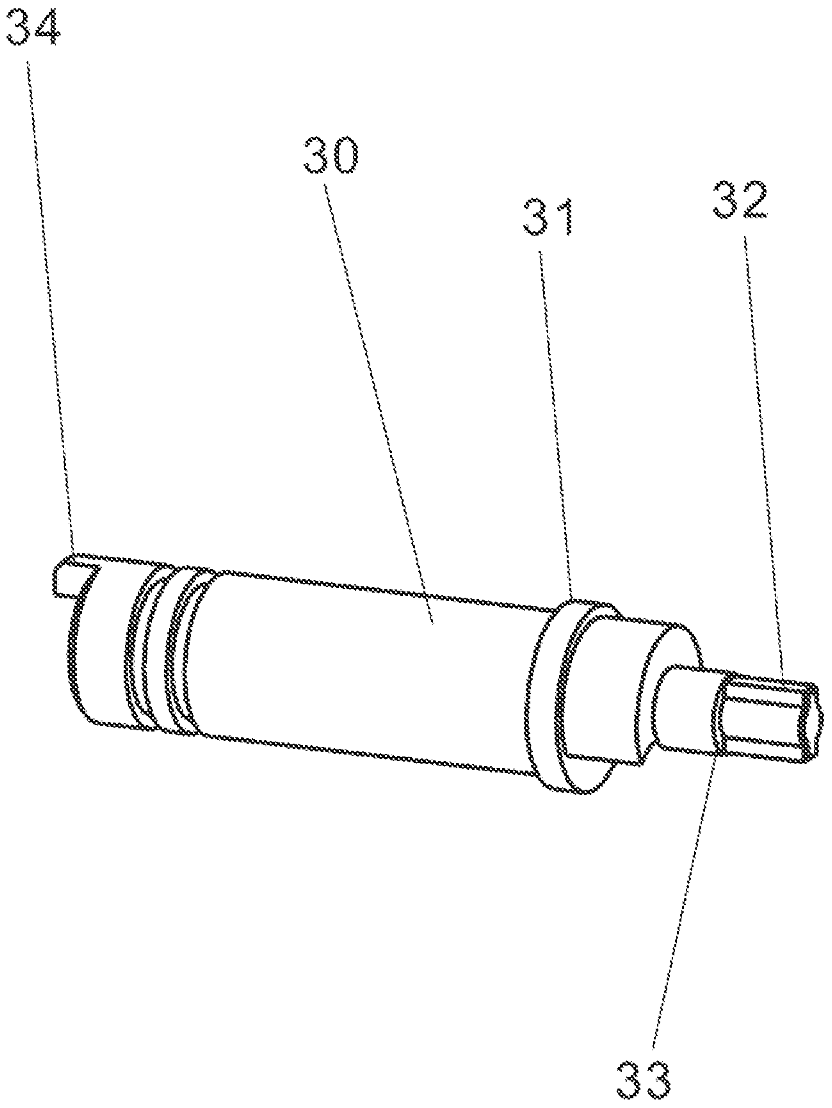
FIG. 5 is a schematic view of a water outlet member in FIG. 1.

Referring to FIG. 5, the water outlet member body 30 is substantially a cylindrical member. According to the direction of the water outlet member body 30 shown in FIG. 3, a right end of the water outlet member body 30 is provided with an insertion shaft 32 extending outward along an axial direction of the water outlet member body 30. This insertion shaft 32 can penetrate through the insertion hole on the water baffle 13 and be inserted into the bore 21 on the swing member 20 to form a non-rotation cooperation. When the swing member 20 swings, it can drive the water outlet member body 30 to swing. A position-limiting surface 33 is formed on a left side of the insertion shaft 32. This position-limiting surface 33 faces the extending direction of the insertion shaft 32, and the position-limiting surface 33 can abut against the wall surface of the water baffle 13 to limit the length of the insertion shaft 32 extending into the bore 21. A circle of abutment flange 31 is circumferentially provided on the sidewall, close to the insertion shaft 32, of the water outlet member body 30. The abutment flange 31 can abut against and cooperate with the end surface of the barrier wall 18 in the mounting hole on the first base 10, thereby forming a complete barrier wall surface, which facilitates the installation of the retaining ring 42 and the bearing 41 etc. An insertion protrusion 34 is provided at the left end of the water outlet member body 30, and the insertion protrusion 34 extends outwardly in a direction parallel to the axial direction of the outlet member body 30. This insertion protrusion 34 is configured for insertion cooperation with the water outlet connector 46. Two sealing ring grooves are provided on the sidewall, close to the insertion protrusion 34, of the water outlet member body 30, and the two sealing ring grooves are configured for mounting the second sealing ring 451 and the third sealing ring 452, respectively.

A water outlet channel 36 is formed inside the water outlet member body 30, and a water inlet port 35 communicating with the water outlet channel 36 is also provided. The water inlet port 35 communicates with the water passing channel 14 after the water outlet assembly is mounted on the first base 10.

The water outlet connector 46 is sleeved on one end of the water outlet member body 30 provided with the insertion protrusion 34, and is configured for insertion cooperation with the insertion protrusion 34, such that the water outlet connector 46 can be fixed on the water outlet member body 30, and sealing can be realized through the second sealing ring 451 and the third sealing ring 452. A water outlet port 461 is provided on the water outlet connector 46, and the water outlet port 461 communicates with the water outlet channel 36 of the water outlet member body 30, and the opening axis of the water outlet port 461 is perpendicular to the swing axis of the swing member 20.

After the water outlet member body 30 is inserted into the mounting hole on the first base 10, the bearing 41, the retaining ring 42, the V-shaped sealing ring 43 and the nut 44 are sleeved on the water outlet member body 30 in sequence from the inside to the outside. Through the threaded cooperation of the nut 44 and the threads inside the mounting hole, the retaining ring 42 can abut against the outer ring of the bearing 41, so as to prevent the bearing 41 from rotating relative to the first base 10. In the meantime, the water outlet member body 30 can be smoothly rotated relative to the first base 10 through the bearing 41. The V-shaped sealing ring 43 can prevent the water flow from leaking after the water flow flows from the water passing channel 14 to the mounting hole. The configuration of the water outlet member can facilitate the swinging water splash to be formed, and the overall structure is simple. The water flow can be discharged through the water passing channel 36. The water outlet member body 30 can swing in synchronization with the swing member 20 through the non-rotation cooperation with the swing member 20. As such, the water outlet structure is simplified, and the complexity of the overall structure of the water outlet device is reduced.

Figure 7:
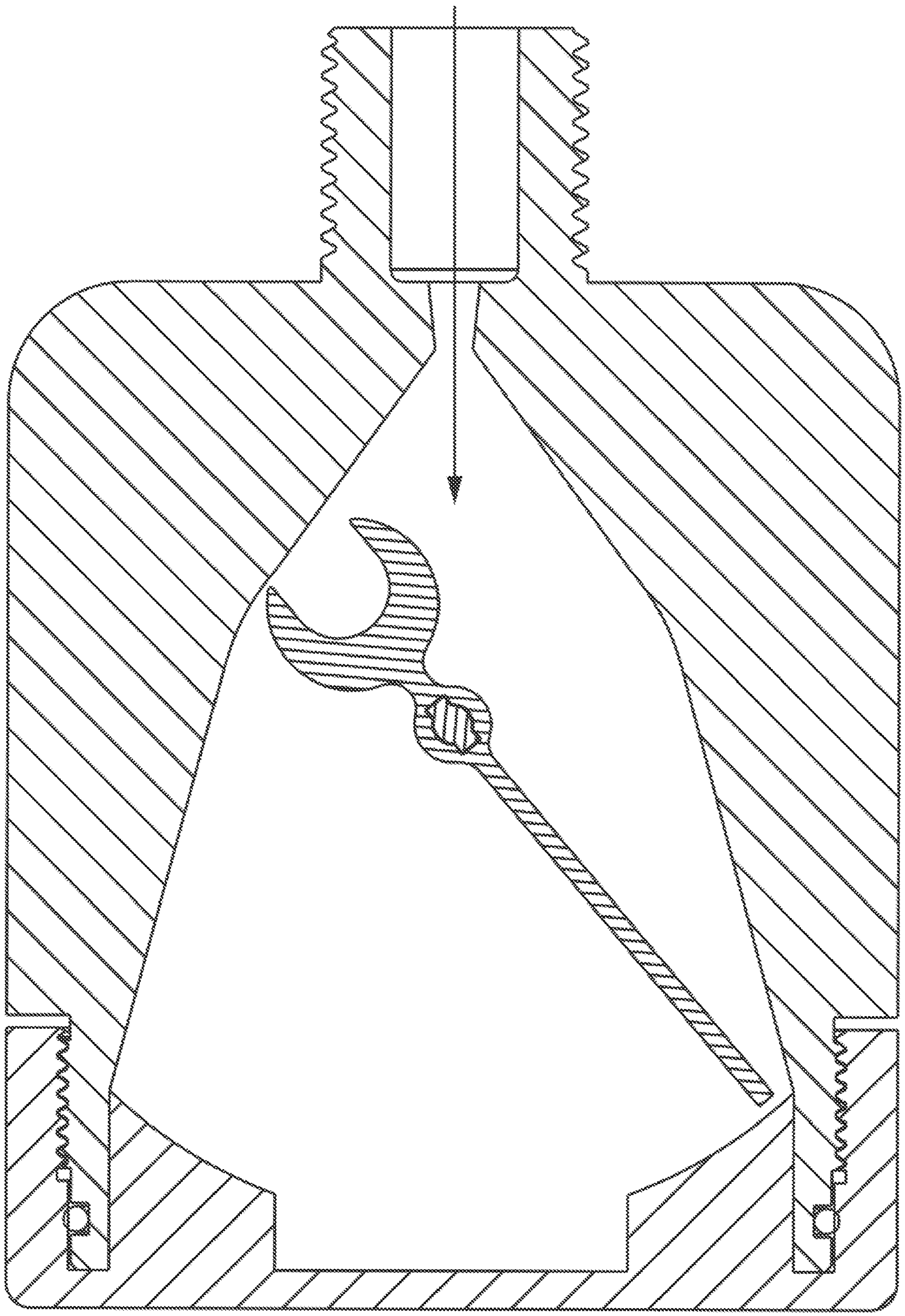
FIG. 7 is a schematic view illustrating that the swing member of the water outlet device in FIG. 1 is in a first position.
Figure 8:
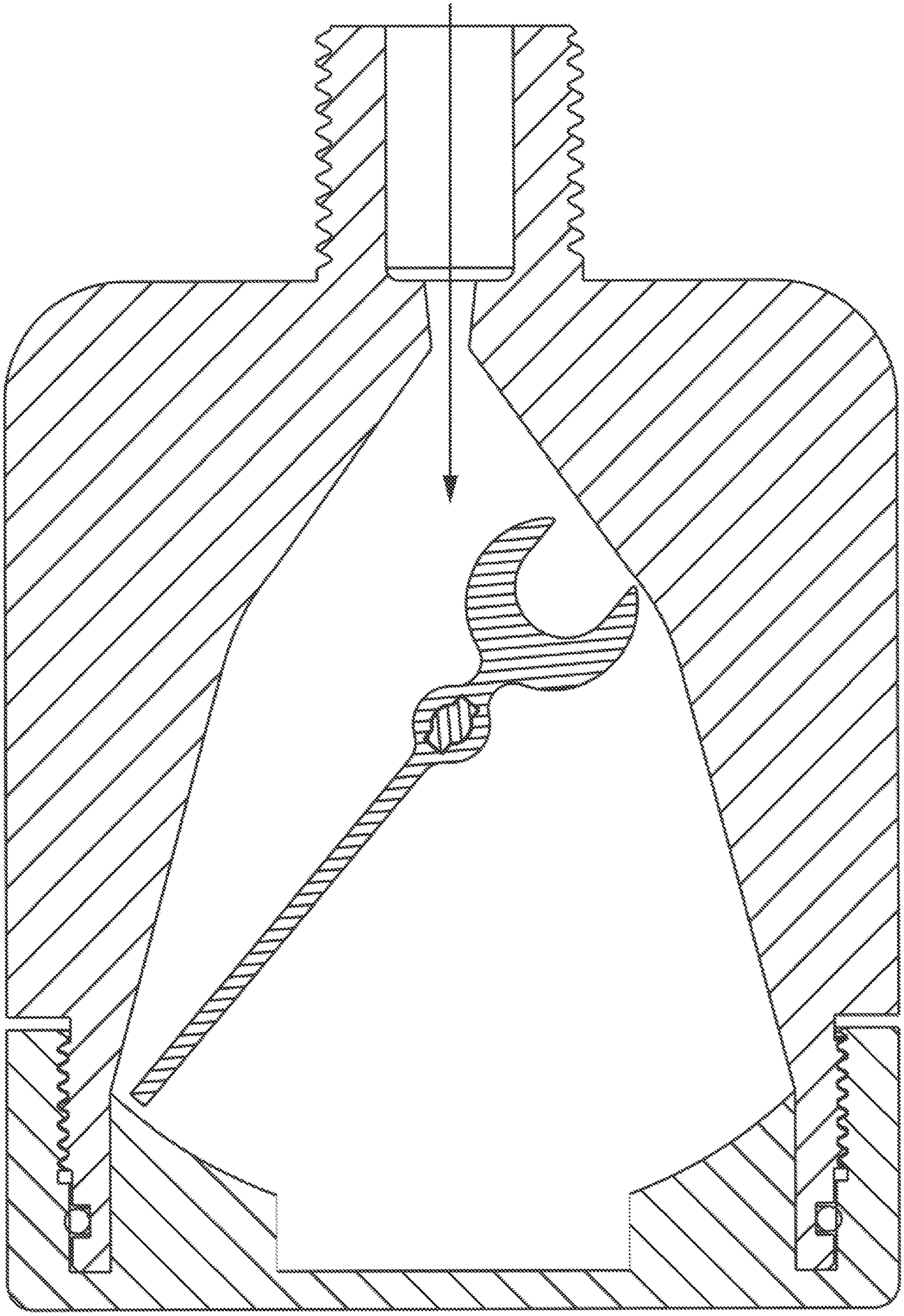
FIG. 8 is a schematic view illustrating that the swing member of the water outlet device in FIG. 1 is in a second position.

Please refer to FIG. 6, FIG. 7 and FIG. 8, a detailed description of how the swing member 20 performs reciprocating swing is described herein.

When the swing member 20 is only subjected to gravity, due to the position of the center of gravity of the swing member 20 itself, the swing member 20 is in the initial position as shown in FIG. 6. In the meantime, there is no water accumulation or water flow in the water passing chamber 12, and the opening of the recess 22 points at the opening of the water inlet hole 112 in the water passing chamber 12. Also, the opening of the water inlet hole 112 in the water passing chamber 12 points at the swing axis of the swing member 20.

Then, the water flow enters the water passing chamber 12 from the water inlet hole 112. After the water flow flows in from the water inlet hole 112, the water first hits the recess 22. The turbulence formed after the water hits the recess 22 will exert a force on the first end portion 23 of the swing member 20, and a torque that pushes the swing member 20 to swing is formed, which causes the swing member 20 to swing left or right. In the meantime, the swing direction is random. In this embodiment, it is exemplified that the first end portion 23 of the swing member 20 swings to the left first.

Under the impact of the water flow, the swing member 20 starts to swing from the initial position to a first position as shown in FIG. 7. In this process, the first end portion 23 of the swing member 20 is always hit by the water flow and generates a torque that is large enough until the swing member 20 swings to a position with the maximum angle, i.e., the first position. Under the circumstances, the opening of the recess 22 of the swing member 20 deviates from the position of water inlet hole 112. At this time, the opening of the recess 22 is located on the left side of a plane which is parallel to the water inlet direction of the water inlet hole 112 and intersecting the swing axis of the swing member 20. In this way, the water flow can hit the second sidewall 26 at the first end portion 23 of the swing member 20.

In the above process of swinging from the initial position to the first position, the second end portion 24 of the swing member 20 is also in a swing state, and due to the shape characteristics of the fourth chamber wall 124 on the water passing chamber 12, after the second end portion 24 is out of range of the water outlet hole 15, the second end portion 24 begins to form a small water gap having a small water passage area with the fourth chamber wall 124. In this process, since the torque applied to the first end portion 23 by the water flow is still greater than the torque applied to the second end portion 24 by the water flow, the swing member 20 still continues to swing to the first position as shown in FIG. 7 after the water passage gap is formed by the second end portion 24 and the fourth chamber wall 124. Under the circumstances, a water passage gap is also formed between the first end portion 23 and the third chamber wall 123. In this condition, the water under the swing member 20 will quickly flow out from the water outlet hole 15, and the top of the swing member 20 will continue to be subjected to water flow pressure, which causes water pressure imbalance on the first sidewall 25 and the second sidewall 26 of the swing member 20. Meanwhile, since the moment arm from the first end portion 23 to the swing axis is smaller than the moment arm from the second end portion 24 to the swing axis, the direction of the torque of the swing member 20 will change, prompting the first end portion 23 of the swing member 20 to swing to the right, while the second end portion 24 swings to the left, that is, the swing member 20 is tending to return to the initial position.

It should be noted that the first end portion 23 and the second end portion 24 of the swing member 20 can be configured to be adjacent to the third chamber wall 123 or the fourth chamber wall 124 to prevent the communication between the water inlet hole 112 and the water outlet hole 15, or the first end portion 23 and the second end portion 24 can be configured to directly abut against the third chamber wall 123 or the fourth chamber wall 124 for the same purpose, which depends on the specific shape of the swing member 20 and the shape of the chamber wall of the water passing chamber 12.

When the swing member 20 returns to the initial position from the first position, due to inertia, the second end portion 24 of the swing member 20 will continue to swing to the left. Under the circumstances, the water flow continues to have an effect on the swing member 20, and after the same process of swinging from the initial position to the first position, the swing member 20 reaches the second position as shown in FIG. 8.

After that, the swing member 20 can repeat the above process under the action of the water flow to realize the reciprocating swing action in the water passing chamber 12 until water stops entering the water inlet hole 112, and the swing member 20 returns to the initial position. Correspondingly, the water outlet member can swing back and forth relative to the body through the swing of the swing member 20. Since the opening axis of the water outlet port 461 is perpendicular to the swing axis, the water outlet device in this embodiment can provide water splashes that are discharged in a swing manner.

When the swing member 20 swings to the maximum angle, the opening of the recess 22 is on one side of the plane which is parallel to the water inlet direction of the water inlet hole 112 and intersecting the swing axis, which can make the water flow hit on the outside of the swing member 20 instead of in the recess 22, thereby reducing the torque change speed of the swing member 20. As such, the swing frequency of the swing member 20 can be decreased, and it can also be ensured that the swing member 20 has a larger swing angle, and the situation that the swing member 20 cannot swing to right position can be prevented.

The swing member 20 has a fulcrum at the position of its swing axis. The effect of the water flow on the swing member 20 will cause the first end portion 23 and the second end portion 24 of the swing member 20 to form a corresponding moment of force. The magnitude of the moment of force is related to the length of the moment arm. The fulcrum of the swing member 20 is set to be closer to the first end portion 23, such that a difference can be formed between the lengths of the moment arms from the first end portion 23 and the second end portion 24 respectively to the swing axis. When the swing member 20 swings to a position at the maximum angle, since the moments of the first end portion 23 and the second end portion 24 are different, the swing member 20 is driven to return to the initial position.

The walls of the water inlet hole 112 are close to each other along the water inlet direction, which can effectively increase the flow rate of the incoming water and the impact strength of the incoming water on the swing member 20, so that the swing member 20 can randomly swing toward one side at the initial stage.

Figure 9:
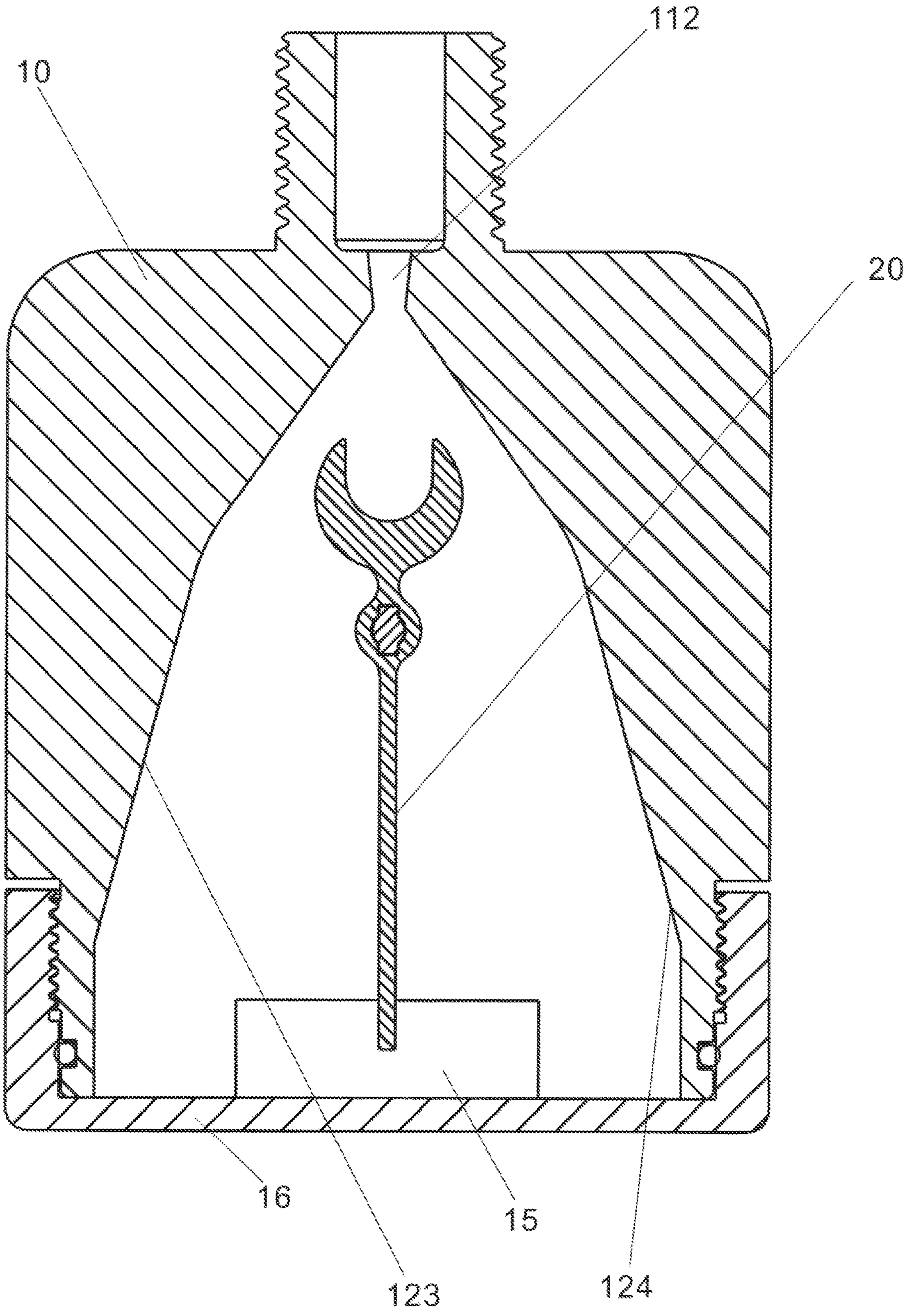
FIG. 9 is a plan sectional view of another embodiment of a water outlet device provided by the present disclosure.

In addition, referring to FIG. 9, the structure of the second base 16 described above can be further improved. In the water outlet device shown in FIG. 9, only the bottom wall of the second base 16 constitutes the bottom chamber wall of the water passing chamber 12, and the third chamber wall 123 and the fourth chamber wall 124 on the first base 10 that constitute the chamber walls of the water passing chamber 12 and are substantially located at the vertical positions are directly extended to the bottom wall of the second base 16. Meanwhile, there is no arc section on the bottom wall of the second base 16, and therefore the chamber walls on both sides of the water outlet port 15 are not close to each other along the water outlet direction. Such structure can facilitate the formation of the second base 16. In the meantime, when the swing member 20 swings, the swing member 20 has to swing to be adjacent to the third chamber wall 123 and the fourth chamber wall 124 which are substantially in the vertical positions, to ensure that the water flow is blocked, thereby defining the maximum swing angle of the swing member 20, so that the swing member 20 has a greater swing angle.

Through the structure and shape cooperation of the above-mentioned swing member 20 and the water passing chamber 12, the swing member 20 can achieve reciprocating swing under the action of water flow without the need to design a complicated swing structure. In the meantime, the swing speed of the swing member 20 can be changed by adjusting the geometrical structure of the swing member itself. As such, the complexity of implementing the swing function in the water outlet device can be reduced, thereby reducing the manufacturing and use costs, and the simple structure also improves the reliability and service life of the device.

Second Embodiment

Figure 10:
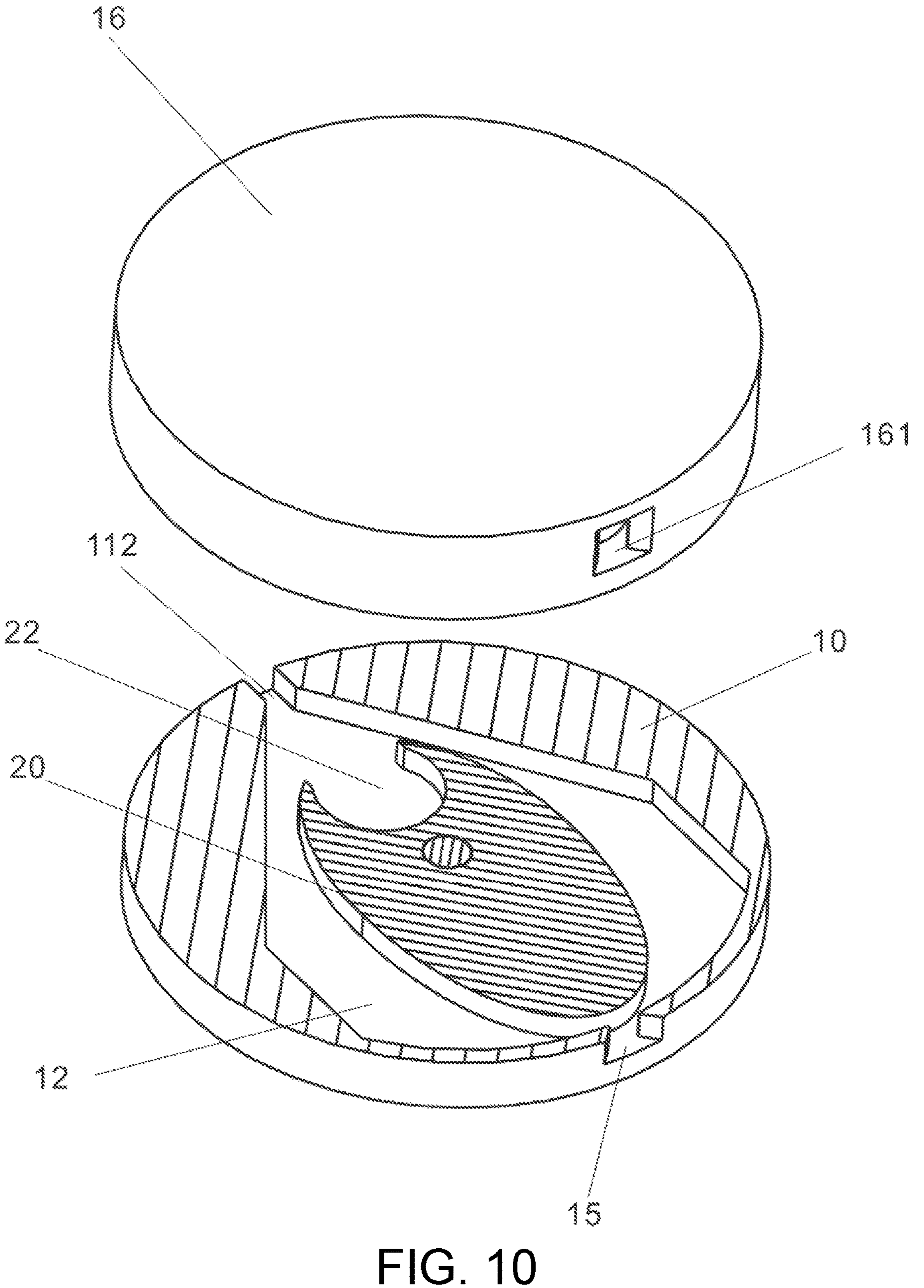
FIG. 10 is a partially exploded view of a second embodiment of a water outlet device provided by the present disclosure.

Referring to FIG. 10, FIG. 10 shows a water outlet device provided by the second embodiment of the present disclosure. The water outlet device mainly includes a body, a swing member 20 and a shaft 50.

The body includes the first base 10 and the second base 16.

Referring to FIG. 10, a surface on one side of the first base 10 is recessed and provided with a special groove-shaped structure. In the meantime, both ends of the groove-shaped structure form a water inlet hole 112 and a water outlet hole

15 respectively. The walls of the water outlet hole 15 are far away from each other along the water outlet direction.

The second base 16 can be placed on the first base 10 and cover the groove-shaped structure on the first base 10 to form the water passing chamber 12. The first base 10 forms the first chamber wall 121, the third chamber wall 123 and the fourth chamber wall 124 of the water passing chamber 12, and the second base 16 forms the second chamber wall 122 of the water passing chamber 12. In addition, the second base 16 is further provided with through holes corresponding to the water inlet hole 112 and the water outlet hole 15 respectively. The through hole corresponding to the water outlet hole 15 form the second base water outlet hole 161. The second base water outlet hole 161 is located at a downstream position of the water outlet hole 15 after the second base 16 is covered on the first base 10, and walls of the second base water outlet hole 161 are also far away from each other along the water outlet direction. Moreover, the hole wall at the water inlet port of second base water outlet hole 161 is aligned with the hole wall at the water outlet port of water outlet hole 15, so that the water is discharged more smoothly.

The structure of the swing member 20 is similar to that of the swing member 20 in the first embodiment, except that the shape is changed, and the swing member 20 is connected to the first base 10 through the shaft 50 in a swing manner.

The shaft 50 is directly fixed on the first base 10.

According to the illustrations of the first and second embodiments, it is easy to know that the swing member 20 can have a variety of shapes. By changing shape characteristics such as the position of the center of gravity of the swing member 20, the length of the moment arms at both ends, the size of the recess and so on, the swing frequency of the swing member 20 can be effectively adjusted.

Figure 11:
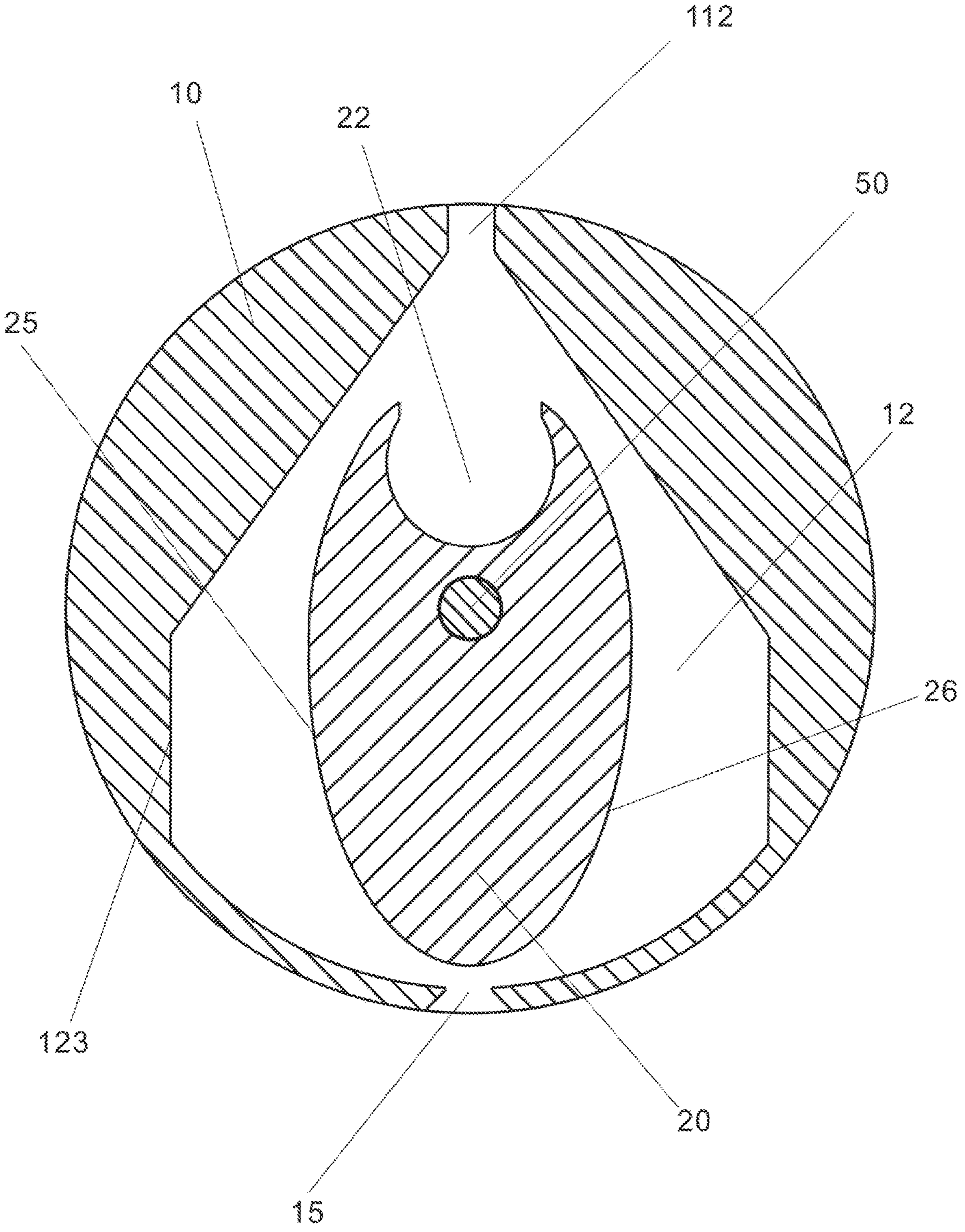
FIG. 11 is a schematic view illustrating that a swing member of the water outlet device in FIG. 10 is in an initial position.
Figure 12:
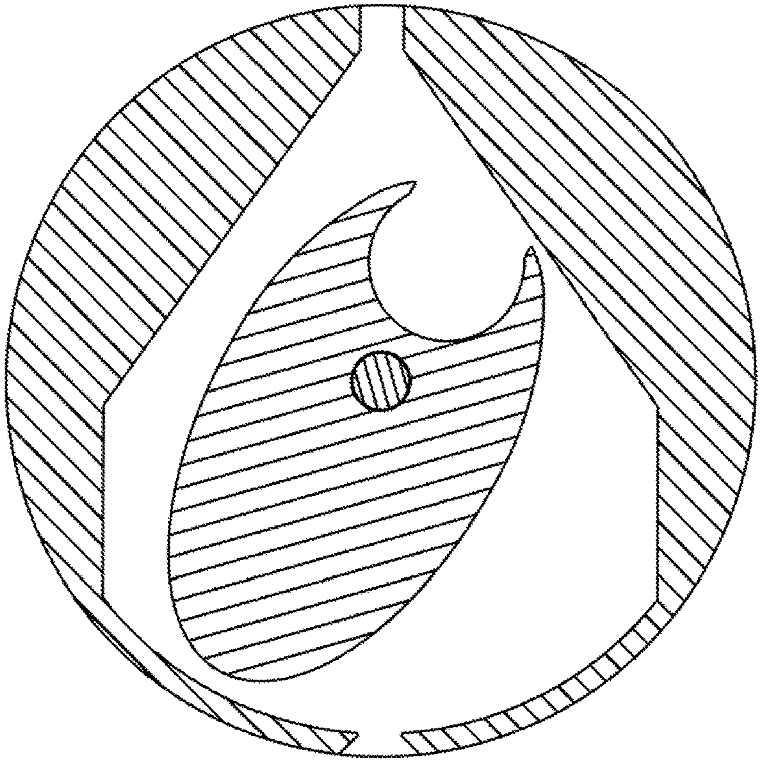
FIG. 12 is a schematic view illustrating that the swing member of the water outlet device in FIG. 10 is in a first position.
Figure 13:
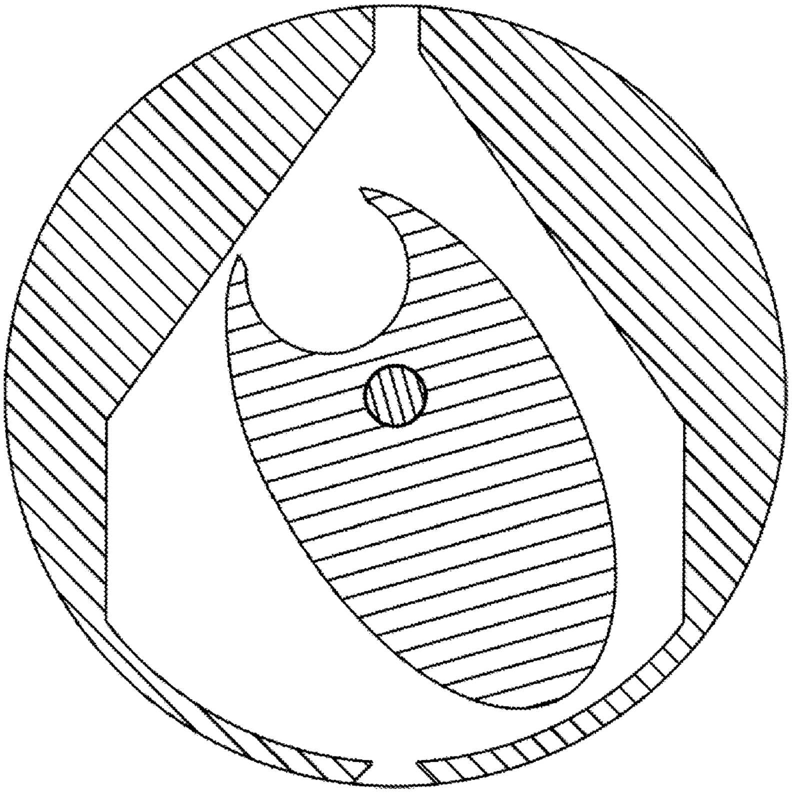
FIG. 13 is a schematic view illustrating that the swing member of the water outlet device in FIG. 10 is in a second position.

Referring to FIG. 11, FIG. 12 and FIG. 13, the swing member 20 in the water outlet device provided in the second embodiment can realize reciprocating swing in the same manner as the swing member 20 in the first embodiment.

The water outlet device provided in the second embodiment can discharge water from the water outlet hole 15 and directly form a swinging water splash. This is because the shape of the water outlet hole 15 is set to a structure in which the hole walls are far away from each other along the water outlet direction, and the water passage area of the water outlet hole 15 is large enough. Taking the state shown in FIG. 12 as an example, when the swing member 20 swings from the initial position to the left and the second end portion 24 is out of the range of the water outlet hole 15, the water on the right side of the swing member 20 will flow out from the water outlet hole 15 along the tilt direction of the swing member 20. Since the walls of the water outlet hole 15 are far away from each other, the water flow will not be restricted by the water outlet hole 15, but will flow out of the water outlet hole 15 along substantially the same flow direction as that of the water flow enters the water outlet hole 15, so that the water is discharged in the manner of swinging to the left. In the subsequent process in which the swing member 20 swings to the second position as shown in FIG. 13, the water flow on the left side of the swing member 20 will flow out from the water outlet hole 15 along the tilt direction of the swing member 20, and the water is discharged in the manner of swinging to the right. Through the above-mentioned method, during the reciprocating swing process of the swing member 20, the water outlet device can directly form a swinging water splash.

Third Embodiment

Figure 14:
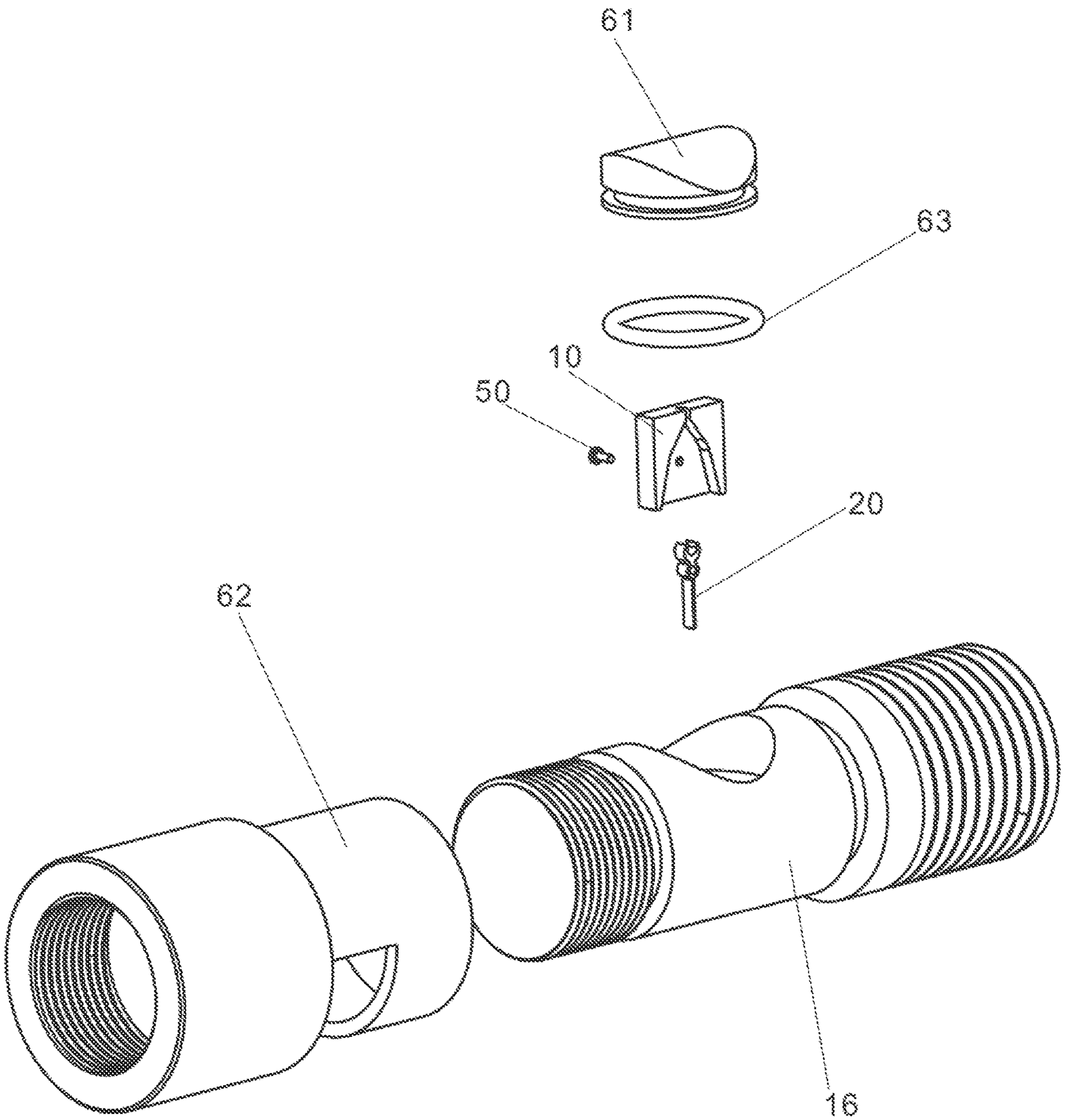
FIG. 14 is an exploded view of a third embodiment of a water outlet device provided by the present disclosure.
Figure 15:
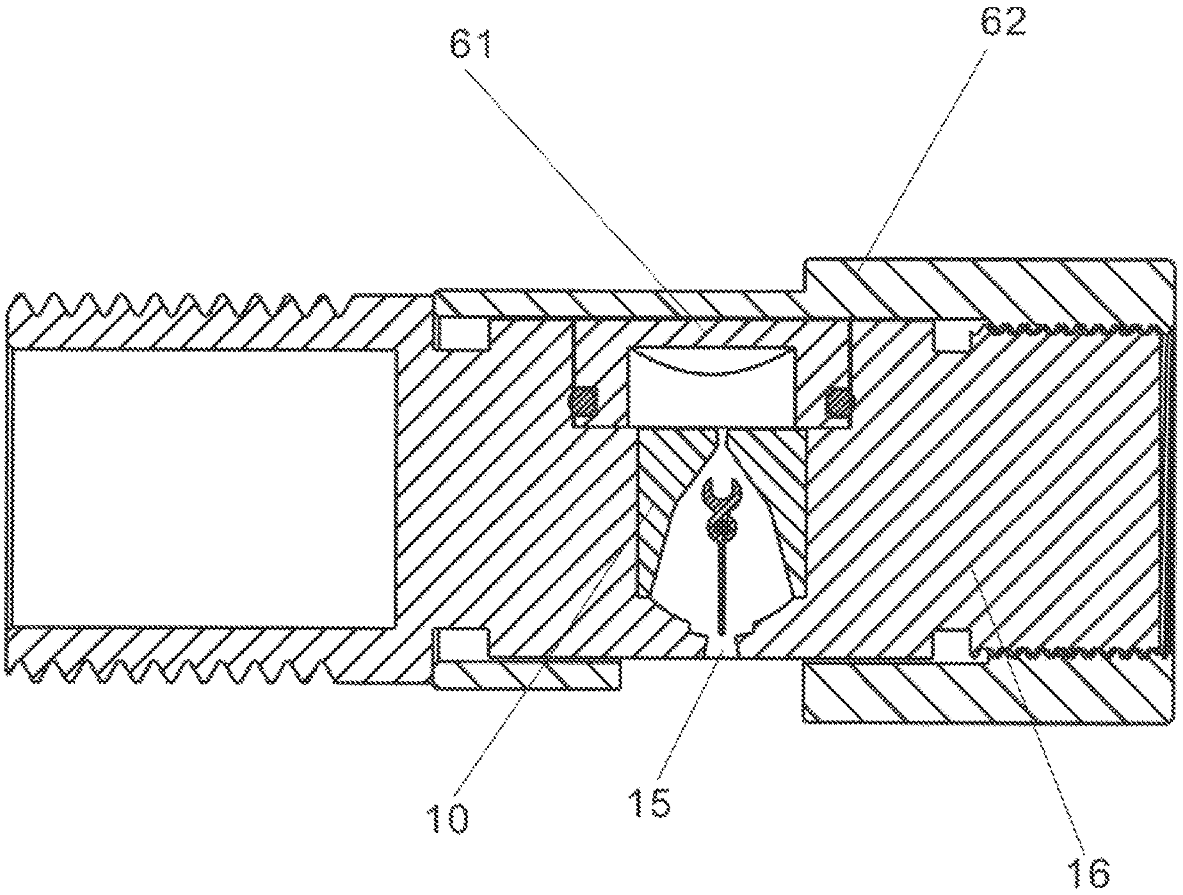
FIG. 15 is a plan cross-sectional view of the water outlet device in FIG. 14 after being assembled.

Please refer to FIG. 14 and FIG. 15, which show a water outlet device provided by the third embodiment. The water outlet device can be used for the hip wash function of a smart toilet, and the water outlet device mainly includes the body, the swing member 20, the shaft 50, a cap 61, a shell 62 and a fourth sealing ring 63.

The body includes the first base 10 and the second base 16.

The structure of the first base 10 is similar to the structure of the first base 10 in the second embodiment, so no further description is incorporated herein.

The second base 16 is a cylindrical member having a slot structure disposed thereon, and the water outlet hole 15 is provided at a bottom portion of the slot structure. The first base 10 can be inserted into the slot structure and cooperate with the wall of the slot structure to form a water passing chamber 12. In the meantime, the second base 16 is also provided with a corresponding water path, which can communicate with the water inlet hole 112 on the body, and transport the water into the water passing chamber 12.

The swing member 20 is connected with the first base 10 through the shaft 50 in a swing manner, and has a shape same as that of the swing member 20 in the first embodiment.

After the swing member 20 is mounted on the second base 16, the cap 61 is inserted into a top portion of the slot of the second base 16, and an outer wall of the cap 61 is sleeved with a fourth sealing ring 63, which can prevent the water flow from leaking in the process of being transported to the water inlet hole 112.

The shell 62 and the second base 16 are threadedly connected together, the shell 62 can be sleeved on the second base 16 and cover the cap 61, and the shell 62 further has a water outlet window at the position corresponding to the water outlet hole 15. This water outlet window is oriented toward the user's hip when the user uses the hip wash function of the toilet.

Fourth Embodiment

Figure 16:
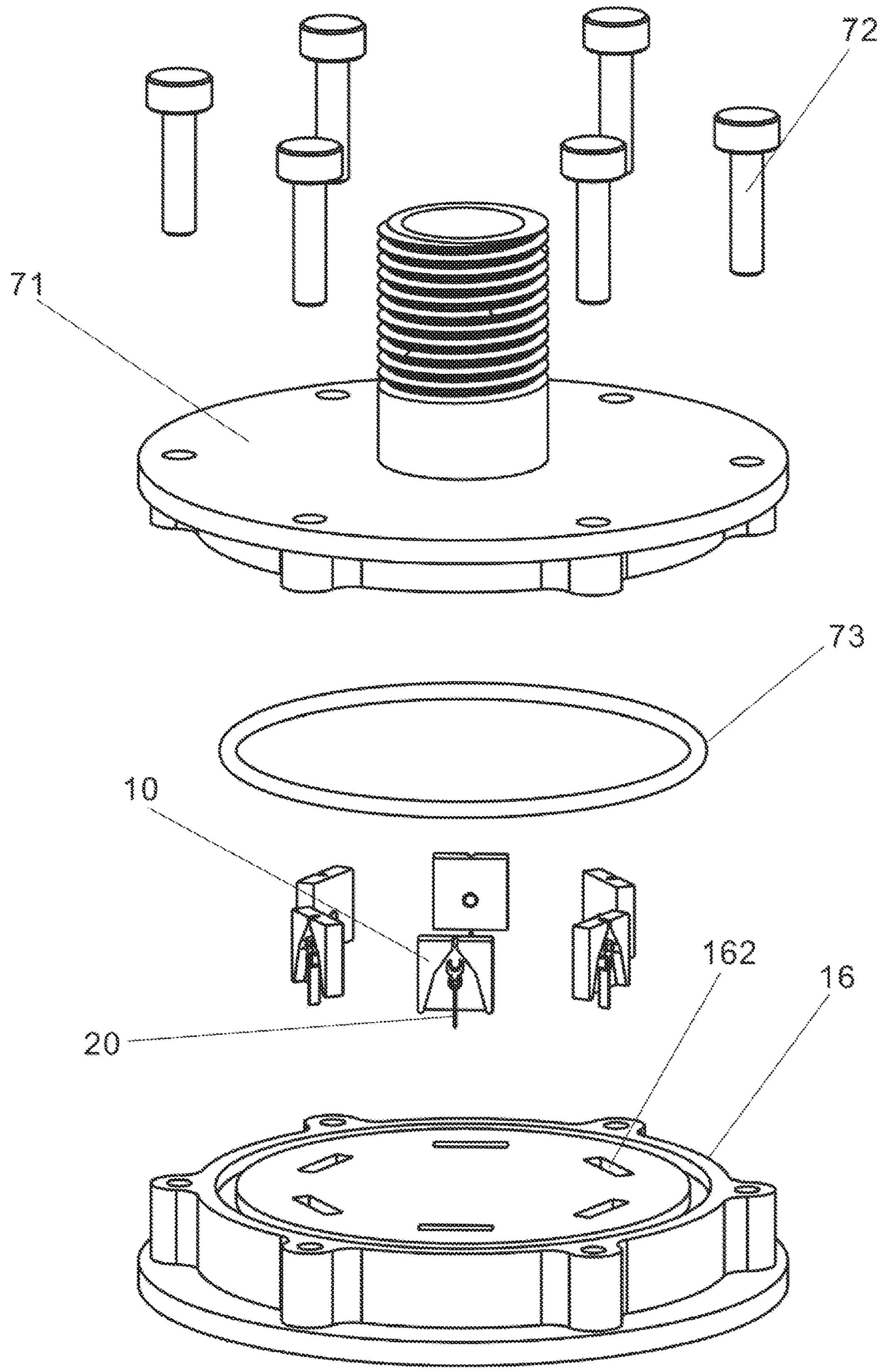
FIG. 16 is an exploded view of a fourth embodiment of a water outlet device provided by the present disclosure.
Figure 17:
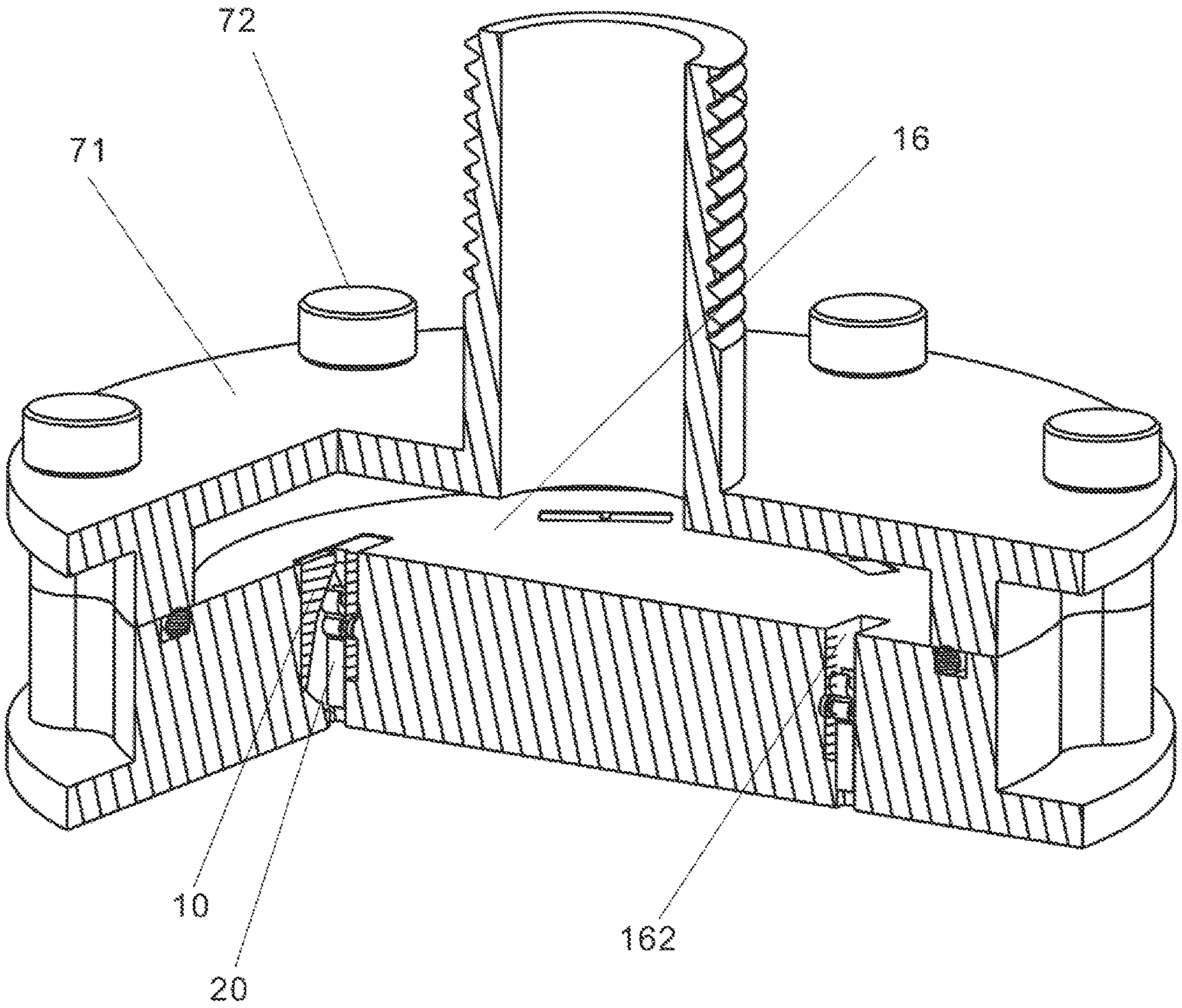
FIG. 17 is a plan cross-sectional view of the water outlet device in FIG. 16 after being assembled.

Please refer to FIG. 16 and FIG. 17, which show a water outlet device provided by the fourth embodiment, and can be applied to the scenarios such as showers. The water outlet device mainly includes the body, the swing member 20, the shaft 50, an upper cover 71, bolts 72, and a fifth sealing ring 73.

The structure of the first base 10 is similar to the structure of the first base 10 in the second embodiment, so no further description is incorporated herein for brevity.

The second base 16 is a cylindrical member with multiple second base mounting cabins 162 arranged around the axis. A bottom portion of the second base mounting cabin 162 is provided with the water outlet hole 15. Multiple first bases 10 can be inserted into the corresponding multiple second base mounting cabins 162 and form the water passing chambers 12 in cooperation with the second base 16.

The swing member 20 is connected with the first base 10 in a swing manner through the shaft 50, and has a shape same as that of the swing member 20 in the first embodiment.

The upper cover 71 is fixedly connected to the second base 16 through the bolts 72, and a pipe for water inlet is provided on the upper cover 71.

The fifth sealing ring 73 is arranged between the upper cover 71 and the second base 16 to prevent the water flow entering the water passing chamber 12 from the upper cover 71 from leaking.

Figure 18:
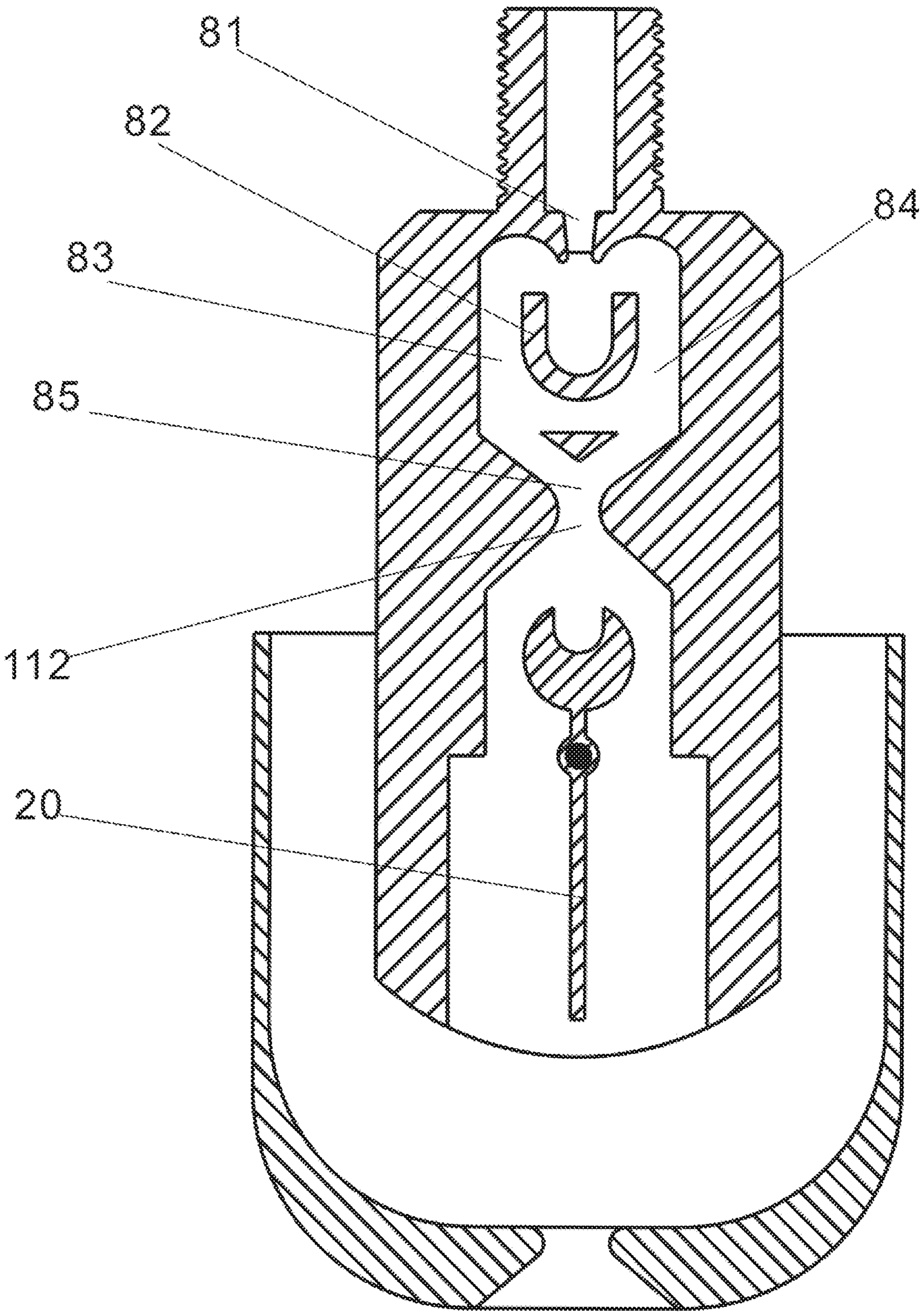
FIG. 18 is a schematic structural view of a fifth embodiment of a water outlet device provided by the present disclosure.

In addition, referring to FIG. 18, on the basis of the first embodiment to the fourth embodiment set forth as above, the present disclosure further provides a fifth embodiment. In the fifth embodiment, a water inlet swing member can further be installed on the water outlet device. The water swing member is disposed at an upstream of the water inlet hole 112, and is configured to alternately input the water flow with a certain swing angle to the water inlet hole 112. Specifically, the water inlet swing member can be integrally formed with the first base 10, and a water chamber is formed therein. A swing member water inlet port 81 is provided at the top portion of the water chamber, and the swing member water inlet port 81 is connected to the external pipeline for water inlet. An intersecting water outlet port 85 is set at the bottom portion of the water chamber, and the intersecting water outlet port 85 is in communication with the water inlet hole 112. It should be noted that the water inlet hole 112 should have a size that is large enough so that the water flow can enter the water passing chamber 12 in a state with a certain variation.

A U-shaped wall 82 is provided in the water chamber of the water inlet swing member, and the U-shaped wall 82 has an opening right facing the swing member water inlet port. Two upper end portions of the U-shaped wall 82 are in communication with two fluid channels, respectively, which are the first fluid channel 83 and the second fluid channel 84. The two fluid channels are located on two sides of the U-shaped wall 82, and these two fluid channels 83, 84 extend along the outside of the U-shaped wall 82 and intersect with each other at the position of the intersecting water outlet port 85. Here, the intersecting water outlet port 85 is below the bottom portion of U-shaped wall 82. The water flow will hit the U-shaped wall 82 after flowing from the swing member water inlet port 81 into the water chamber. Afterwards, the water flow will randomly reach one of the two fluid channels, and then flow from the intersecting water outlet port 85 to the water inlet hole 112, thereby discharging water alternately. Since the water outlet angles of the two fluid channels intersect with each other, the water flow from the intersecting water outlet port 85 will swing alternately, thereby forming a water flow with greater turbulence. This kind of water flow hitting on the swing member 20 will better facilitate the swing member 20 to swing.

Figure 19:
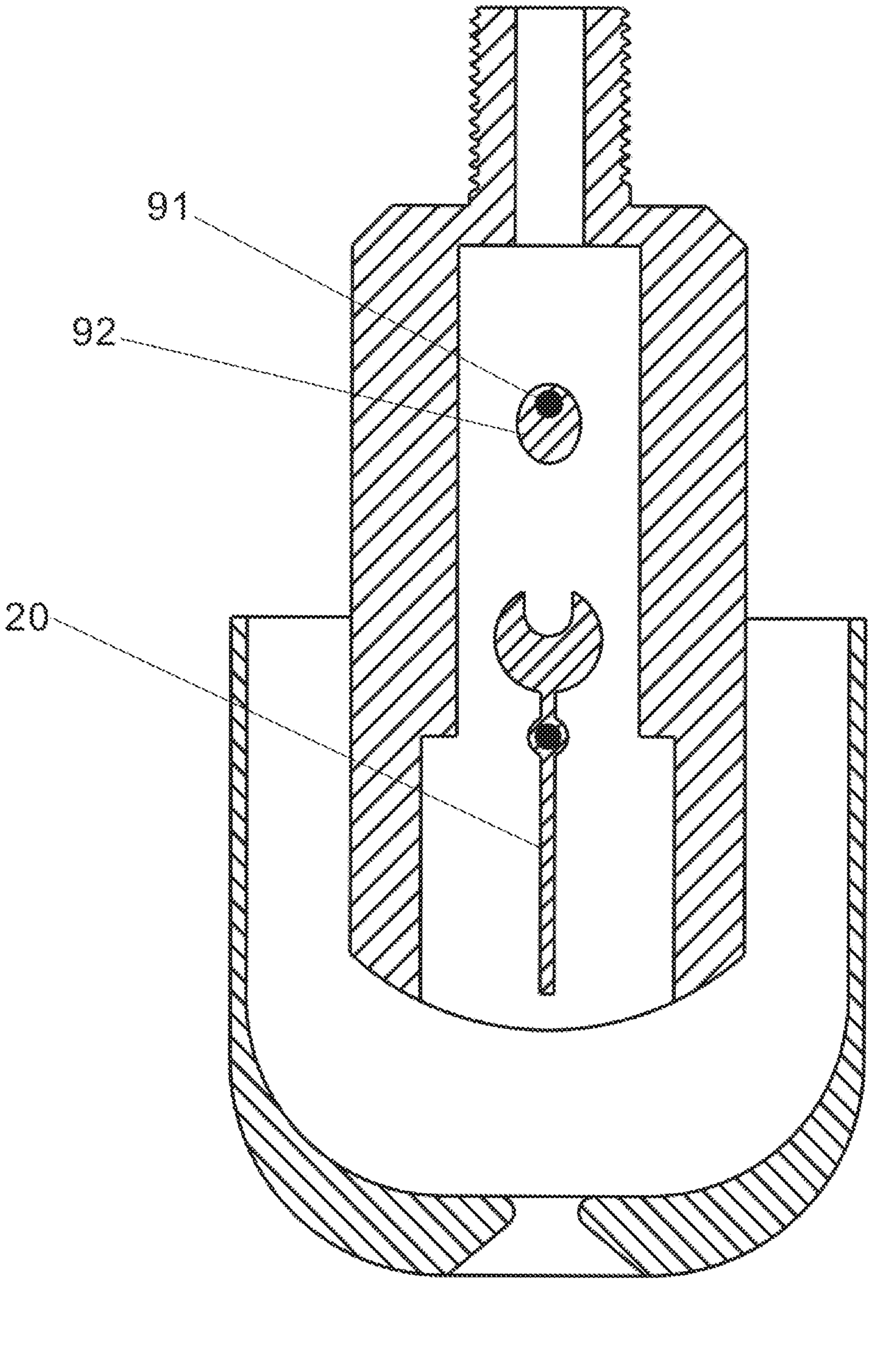
FIG. 19 is a schematic view of a sixth embodiment of a water outlet device provided by the present disclosure.

In addition, referring to FIG. 19, on the basis of the first embodiment to the fourth embodiment set forth as above, the present disclosure further provides a sixth embodiment. In the sixth embodiment, a water inlet swing member having another structure can be mounted on the water outlet device. In this embodiment, the first base 10 is further provided with a water inlet chamber, a top portion of the water inlet chamber is in communication with the external water inlet pipe for receiving the incoming water, and the bottom portion of the water inlet chamber is in communication with the water inlet hole 112 for delivering water to the water passing chamber 12. It should be noted that the water inlet hole 112 should have a size that is large enough, such that the disturbed water flow can enter the water passing chamber 12 at a relative turbulent state.

A water inlet swing member is mounted in the water inlet chamber. The water inlet swing member is mainly composed of a rotation shaft 91 and a swing member 92. The rotation shaft 91 enables the swing member 92 to be rotatably connected in the water inlet chamber, and the swing member 92 has a spindle-shaped section in a vertical direction. When water hits the swing member 92, the swing member 92 swings, which will disturb the water flow passing by the swing member 92, making the water flow entering the water inlet hole 112 in a more turbulent state. While hitting on the swing member 20, the water in turbulent state will better facilitate the swing member 20 to swing.

The swing structure and the corresponding water outlet device provided by the present disclosure can directly impact the swing member through water flow, such that the reciprocating swing action of the swing member is realized, and then the swing member cooperates with the water outlet member or agitate the water flow at the water outlet port to form a swinging water splash. The overall structure is relatively simple, the reliability is higher than that of the existing water outlet device with a swinging water outlet function, and the manufacturing cost is also reduced.

The descriptions in the foregoing specification and embodiments are used to explain the scope of the present disclosure, but do not constitute a limitation on the scope of the present disclosure. Through the teaching of the present disclosure or the above-mentioned embodiments, those of ordinary skill in the art can combine common knowledge, common technical knowledge in the field and/or the prior art to derive modifications, equivalent replacements or other improvements of the embodiments or some technical features of the disclosure through logical analysis, reasoning, or limited experiments, and the modifications, equivalent replacements or other improvements of the embodiments or some technical features of the disclosure should fall within the scope of the present disclosure.

What is claimed is:

1. A swing structure, comprising:

a body, provided with a water passing chamber, a water inlet hole and a water outlet hole that are in communication with the water passing chamber and respectively located on upper and lower sides of the water passing chamber;

a swing member, connected to the body in a swing manner around a swing axis and located in the water passing chamber, wherein two sidewalls, perpendicular to the swing axis, of the swing member are in clearance fit with-two chamber walls of the water passing chamber correspondingly, and the swing member is provided with a first end portion and a second end portion respectively on upper and lower sides of the swing member relative to the swing axis;

wherein the first end portion is provided with a recess, an opening of the recess is oriented toward the water inlet hole when the swing member is only subjected to gravity to be in an initial position; and the swing member is configured to receive an impact of water flow guided by the water inlet hole, and the first end portion and the second end portion of the swing member are adjacent to or abut against the chamber walls of the water passing chamber when the second end portion swings out of a range of walls of the water outlet hole.

2. The swing structure according to claim 1, wherein the water passing chamber is enclosed by a first chamber wall and a second chamber wall that are opposite to each other, and a third chamber wall and a fourth chamber wall that are opposite to each other; the first chamber wall and the second chamber wall are in clearance fit with the swing member; portions of the third chamber wall and the fourth chamber wall adjacent to the water inlet hole are inclined to be far away from each other along a water inlet direction, and portions of the third chamber wall and the fourth chamber wall adjacent to the water outlet hole are inclined to be close to each other along a water outlet direction.

3. The swing structure according to claim 2, wherein when the swing member swings to a maximum angle, the opening of the recess is located on one side of a plane which is parallel to the water inlet direction of the water inlet hole and intersecting the swing axis of the swing member.

4. The swing structure according to claim 3, wherein a moment arm that is generated due to water flow from the first end portion of the swing member to the swing axis is smaller than a moment arm from the second end portion of the swing member to the swing axis.

5. The swing structure according to claim 4, wherein walls of the water inlet hole are inclined to be close to each other along the water inlet direction.

6. The swing structure according to claim 1, wherein a water inlet swing member is disposed at an upstream of the water inlet hole; the water inlet swing member is provided with a swing member water inlet port, a U-shaped wall having an opening that faces the swing member water inlet port, two fluid channels located at two sides of the U-shaped wall, and an intersecting water outlet port in communication with both of the two fluid channels; and the intersecting water outlet port is in communication with the water inlet hole.

7. The swing structure according to claim 1, wherein a water inlet swing member is disposed at an upstream of the water inlet hole; the body is provided with a water inlet chamber communicating with an external water inlet pipe, and a bottom portion of the water inlet chamber is in communication with the water inlet hole; wherein the water inlet swing member is rotatably connected to the water inlet chamber and provided with a swing member; and the swing member is configured to swing under the impact of water flow and disturb water flow entering the water inlet hole.

8. A water outlet device, comprising the swing structure as claimed in claim 1, wherein walls of the water outlet hole are inclined to be far away from each other along a water outlet direction.

9. The water outlet device according to claim 8, wherein the body comprises a first base and a second base fixed to each other, and the first base and the second base cooperatively form the water passing chamber; the swing member is rotatably connected to the first base or the second base.

10. The water outlet device according to claim 9, wherein the second base is fixedly connected to a plurality of the first bases, and the second base and the plurality of the first bases correspondingly forms a plurality of water passing chambers with a same quantity as that of the first bases, and each of the water passing chambers is equipped with a corresponding swing member.

11. A water outlet device, comprising the swing structure as claimed in claim 1 and a water outlet member;

the water outlet member is non-rotatably connected to the swing member, and is provided with a water outlet port that is located outside the body and in communication with the water outlet hole of the water passing chamber; and a projection of an axis of the water outlet port and a projection of the swing axis at least on one plane intersect each other.

12. The water outlet device according to claim 11, wherein the body is provided with a water passing channel; the water outlet member is provided with a water outlet channel in communication with the water outlet port; a bottom portion of the water passing channel is in communication with the water passing chamber through the water outlet hole, and a top portion of the water passing channel is in communication with the water outlet channel.

* * * * *